United States Patent

Strid et al.

[11] Patent Number: 6,113,783
[45] Date of Patent: Sep. 5, 2000

[54] DEVICE IN A FILTER SECTOR FOR A ROTATING FILTER DISC

[75] Inventors: Kent Strid, Järbo; Rolf Oswaldson, Gävle, both of Sweden

[73] Assignee: Kvaerner Pulping AS, Norway

[21] Appl. No.: 09/147,864

[22] PCT Filed: Sep. 18, 1997

[86] PCT No.: PCT/SE97/01570

§ 371 Date: Jun. 14, 1999

§ 102(e) Date: Jun. 14, 1999

[87] PCT Pub. No.: WO98/11972

PCT Pub. Date: Mar. 26, 1998

[30] Foreign Application Priority Data

Sep. 19, 1996 [SE] Sweden .................................. 9603430

[51] Int. Cl.[7] .................................................. B01D 33/00
[52] U.S. Cl. ...................... 210/331; 210/346; 210/404; 210/487; 210/347
[58] Field of Search .................... 210/107, 391, 210/393, 404, 409, 331, 486, 487, 498, 346, 347

[56] References Cited

U.S. PATENT DOCUMENTS

| | | |
|---|---|---|
| 2,781,133 | 2/1957 | Thompson . |
| 3,917,534 | 11/1975 | Moore . |
| 3,948,779 | 4/1976 | Jackson . |
| 4,162,982 | 7/1979 | Chesner . |
| 4,889,625 | 12/1989 | Nilsson . |
| 4,931,179 | 6/1990 | Nilsson . |
| 5,227,065 | 7/1993 | Strid . |
| 5,238,564 | 8/1993 | Luthi . |
| 5,258,120 | 11/1993 | Knodel et al. . |
| 5,330,644 | 7/1994 | Nilsson . |
| 5,618,422 | 4/1997 | Pelkio . |
| 5,674,396 | 10/1997 | Wenzl et al. . |

FOREIGN PATENT DOCUMENTS

| | | |
|---|---|---|
| WO 87/04640 | 8/1987 | European Pat. Off. . |
| 4427849A1 | 8/1996 | Germany . |
| 2029718 | 3/1980 | United Kingdom . |
| WO9104090A1 | 4/1991 | WIPO . |

*Primary Examiner*—David A. Simmons
*Assistant Examiner*—Fred Prince
*Attorney, Agent, or Firm*—Fasth Law Offices; Rolf Fasth

[57] ABSTRACT

A filter sector for a rotating filter disc has filtrate conduits for filtrate resulting from filtration which is discharged at the more narrow end of the filter sector. The filtrate conduits are outwardly defined by a filtrating layer permeable to the filtrate. The filter sector has at least one element provided with a profiling forming the filtrate conduit. The profiled element itself forms the filtrating layer because the profiled element has a perforation permeable to the filtrate.

13 Claims, 4 Drawing Sheets

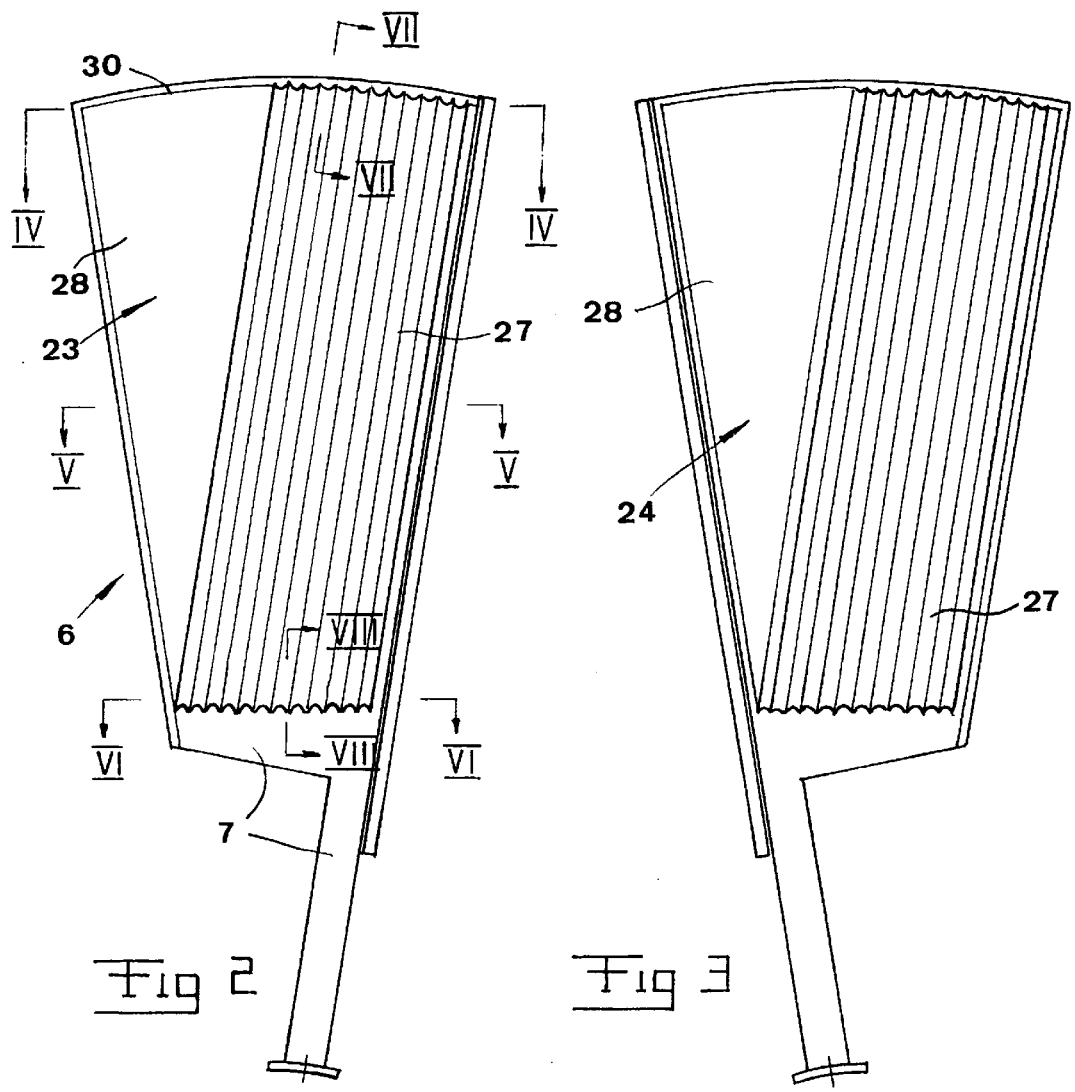

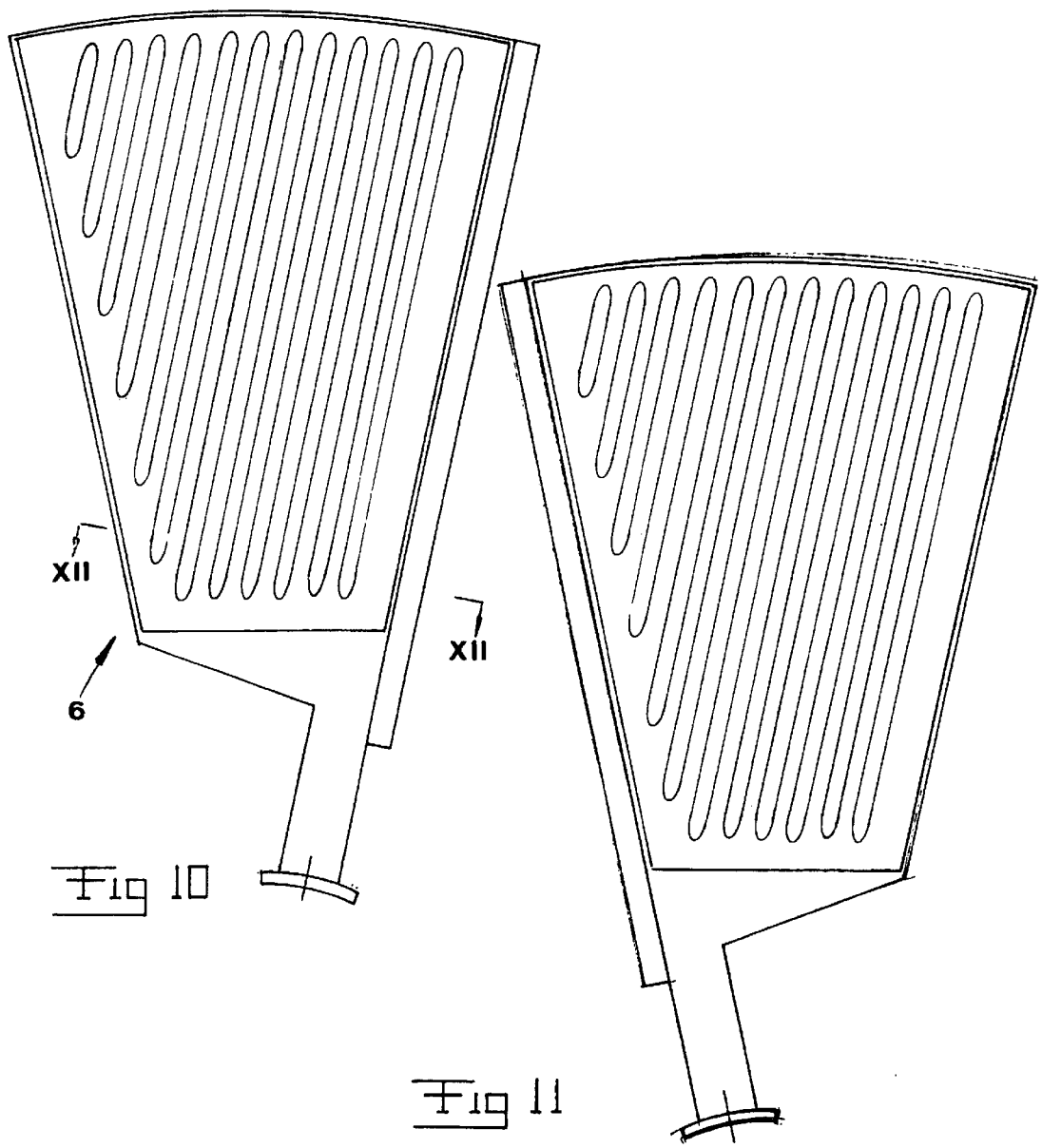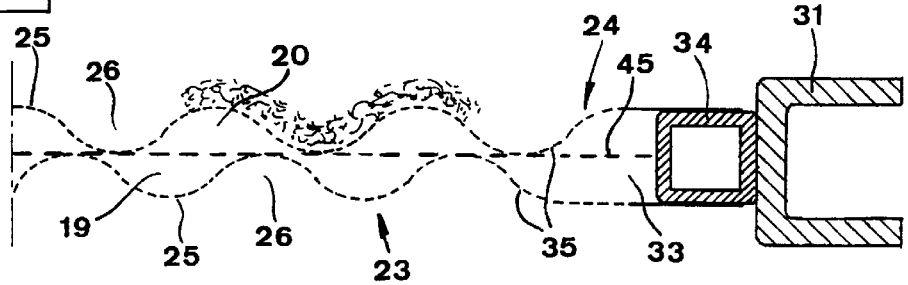

DEVICE IN A FILTER SECTOR FOR A ROTATING FILTER DISC

FIELD OF THE INVENTION AND PRIOR ART

This invention is related to a device in a filter sector for a rotating filter disc, said filter sector having filtrate conduits intended for filtrate resulting from filtration, said filtrate being discharged at the more narrow end of the filter sector, said filtrate conduits being outwards defined by a filtrating layer permeable to said filtrate and said filter sector comprising at least one element provided with a profiling forming said filtrate conduits.

BACKGROUND AND SUMMARY OF THE INVENTION

The device according to the invention may be utilized in connection with any liquid medium, comprising various liquids, suspensions, etc containing constituents desired to be filtered away. Even if the invention in no way is restricted thereto, a preferred application of the invention is in connection with dewatering of fibre suspensions. As fibres, cellulose fibres are primarily in view.

A device of the above mentioned type is previously known from the Swedish patent 8903128-0 (465 658). The filtrating layer is in the known device formed by a fibre cloth surrounding said at least one profiled element. When the filtrate comes through the filter cloth, it will thus enter into filtrate conduits formed between the filter cloth and said at least one profiled element. The filter cloth will thereby extend substantially flat over the peaks of the profilings of said at least one profiled element.

A disadvantage with such a filter cloth is that it is proportionately sensitive and may thus easily be damaged, which necessitates operation breakdowns in order to change filter cloths. The active surface of the filter is further limited to substantially the sum of the surface of both sides of the filter sector due to the fact that the filter cloth extends substantially flat on these sides.

The object of this invention is to further develop the device according to the prior art so as to simplify the embodiment of the filter sector and at the same time create the necessary conditions for increased filtration capacity of the filter sector.

This object is according to the invention achieved by that the profiled element itself forms the filtrating layer as a consequence of that said profiled element has a perforation permeable to said filtrate.

Thus, the need for a filter cloth will completely be eliminated; said at least one profiled element will itself by way of its perforation fulfil the filtrating function, which according to prior art was taking care of by means of a separate filter cloth. Further, a capacity increase is achieved by the solution according to the invention by means of that the total filter surface on the filter sector is increased as a consequence of the profiling of said at least one element.

The circumstance that the filtrating layer according to the invention thus will be formed by a profiled layer has surprisingly for a man skilled in the art turned out to not involve any difficulties regarding releasing material filtered away and deposited on the filter sector. This release takes in the preferred case place by means of water jet nozzles.

The projections/recesses formed by the profiling may have the character of elongated ridges/valleys, but may also be more point-like, for example in the form of bulges.

BRIEF DESCRIPTION OF THE DRAWINGS

With reference to the enclosed drawings a more specific description of embodiment examples of the invention will follow hereunder.

In the drawings:

FIG. 2 is a view from one side of a filter sector comprised in a filter disc of the disc filter, FIG. 3 is a view of the filter sector according to FIG. 2 seen from its opposite side, FIG. 4 is a cut illustrating the forming at IV—IV in FIG. 2, FIG. 5 is a cut at V—V in FIG. 2, FIG. 6 is a cut at VI—VI in FIG. 2, FIG. 7 is a cut along the line VII—VII in FIG. 2, FIG. 10 is a view similar to FIG. 2 of a filter sector according to an alternative embodiment, FIG. 11 is a view of said filter sector according to FIG. 10 seen from the opposite side, and FIG. 12 is a cut along the line XII—XII in FIG. 10.

DETAILED DESCRIPTION OF PREFERRED EMBODIMENTS

The device according to the invention will hereinafter be described as applied for dewatering of cellulose fibre pulp.

Figure 1:
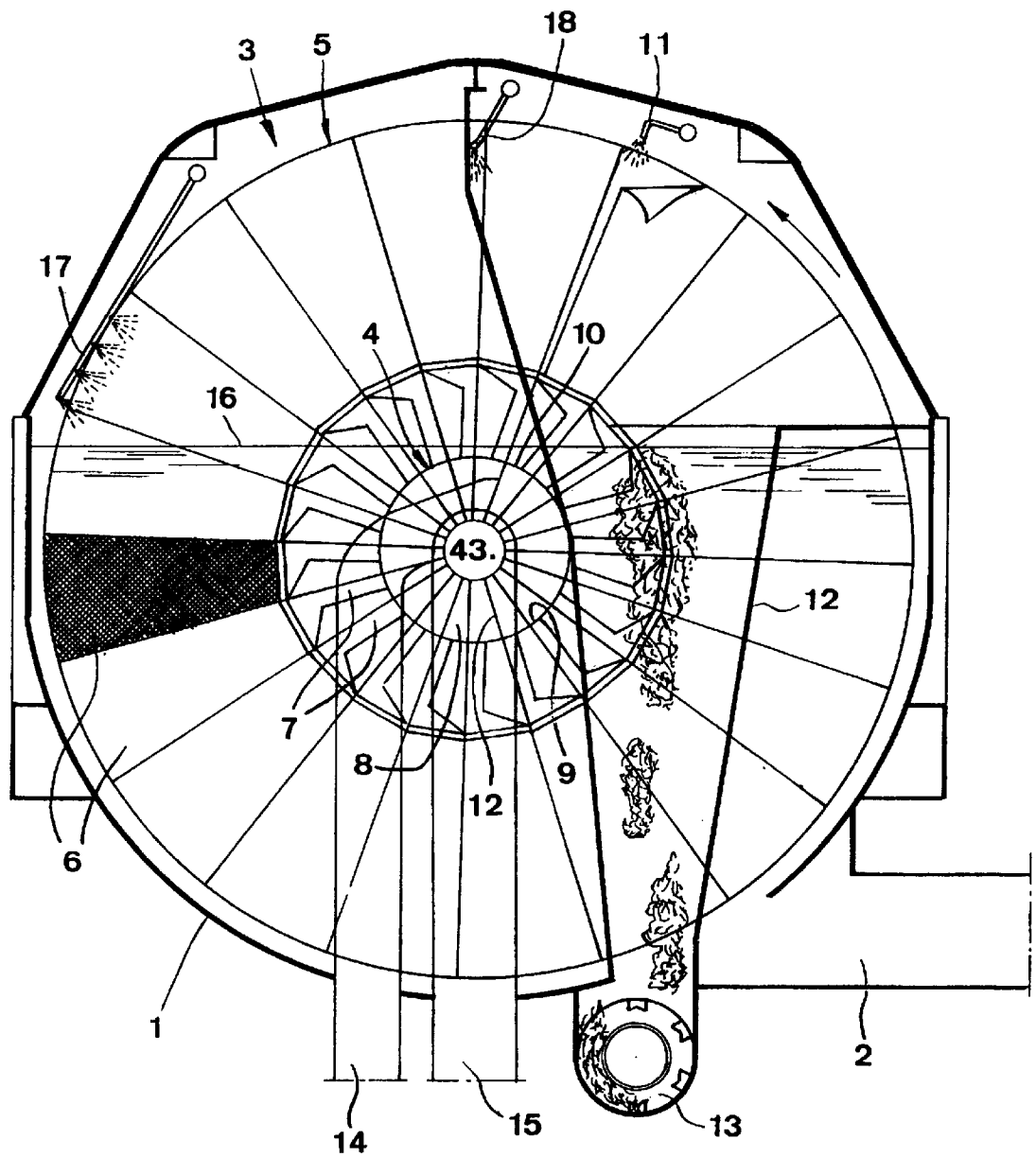
FIG. 1 is a diagrammatical, partly cut view of a so called disc filter seen along the axis of rotation of the filter.
Figure 8:
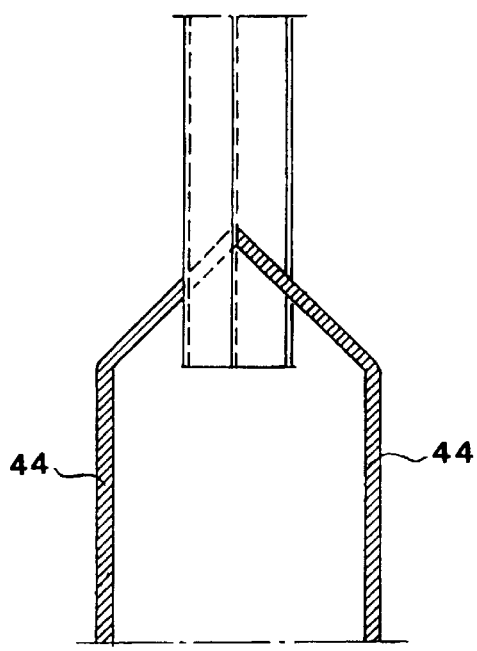
FIG. 8 is a cut along the line VIII—VIII in FIG. 2.

The disc filter illustrated in FIG. 1 comprises a container, which is generally denoted 1 and which has an inlet 2 for the fibre suspension. A rotor, which is generally denoted 3 is rotatably arranged in the container 1. This rotor comprises an inner corelike rotor part 4 and a number of filter discs 5 orientated transversely to the geometrical axis of the inner rotor part 4. This geometrical axis coincides with the axis of rotation of the rotor. The filter discs 5 are orientated substantially perpendicularly to the axis of rotation of the rotor so that the single filter disc 5 will extend in an annular configuration around the inner rotor part 4. This annular configuration is more specifically divided into a number of filter sectors 6. Each of these filter sectors 6 has inner filtrate conduits, which are outwardly defined by a filtrating layer permeable to the filtrate. It is in FIG. 1, regarding one of these filter sectors, illustrated by means of close lines intersecting each other, that the filter sector in question is intended to have an outer permeable filtrating layer.

It appears from FIG. 1 that each single filter sector 6 has a pipe-like conduit section 7 for transferring the filtrate, i.e. the filtrated water, from the filtrate conduits in the filtrating part of the filter sector into a respective filtrate conduit 8 in the rotor part 4 through an opening 9 in a covering 10 of the rotor part 4, which opening is arranged for the filter sector in question.

The disc filter comprises means 11 for releasing fibre material, which has been filtered away, and which is deposited on the filter discs. These releasing means 11 are here formed by spray nozzles arranged to separate, by means of suitable spraying of water or other liquid, the mat of material, which has been filtered away, from the filter sectors as they rotate by. A shaft-like receiver 12, in which released material is intended to drop, is arranged between two neighbouring filter discs. The different shafts may be connected by means of an under conduit, which extends along the axis of rotation of the filter rotor, in which conduit means 13, for example a transportation screw, may be arranged for removal of the material, which has been filtered away.

The pipe-like conduit sections 7 form a spoke configuration between the filter sectors 6 and the inner rotor part 4, i.e. there are open spaces between these individual spokes. These open spaces make it possible for the fibre suspension to distribute itself uniformly along the length of the container 1. Besides, the fibre suspension may of course distribute itself within the container 1 through the slots occurring radially outwardly of the peripheries of the filter discs 5 and the inside of the container 1. The inner rotor part 4 has the character of a rotatably journalled centre shaft.

The filtrate conduits 8 within the central shaft 4 have the character of sector-shaped spaces mutually separated by means of substantially radially orientated partition walls 12 extending along the entire length of the centre shaft 4. The centre shaft 4 has a tubular core 43, against the mantle of which the partition walls 12 adjoin tightly.

It appears from FIG. 1 how two outlets 14, 15 are provided for filtrate. The outlet 14 is intended for a pre-filtrate (cloudy filtrate) whereas the outlet 15 is intended for a clear filtrate. These outlets 14, 15 are arranged on one end of the centre shaft 4 and so stationary disposed in a well known way that the pre-filtrate outlet communicates with the filtrate conduits 8 belonging to the filter sectors 6, which after being released from mats of material filtered away move down into the suspension prevailing in the container 1, the level of which suspension is denoted at 16 and is for example situated just above the centre shaft 4. The device may thereby be of the kind that the water flowing into the filter sectors 6 by influence of gravitation may exit in the pre-filtrate outlet 14 when the filter sectors move down into the suspension and have moved a distance down into the suspension. The filtrate conduits 8 will thereafter be connected to the clear filtrate outlet 15, which advantageously may be supplied with a negative pressure in order to achieve suction of the filtrate into and through the filter sectors. When the filter sectors on the other side of the container then move out of the suspension, air will be suctioned through the filter sectors and through the mats of material, which has been filtered away, said mats being located on the filter sectors, so that a drying effect to a certain extent arises before the mats of material are finally removed from the filter sectors with the aid of the means 11. Furthermore, the disc filter has means 17 for cleaning the filter sectors after they are released from deposited fibre material with the aid of the removal means 11. In order to avoid undesired deposits of fibre material on the walls limiting the shaft 12, means 18 may be provided in order to spray water on one or several of said walls.

The detailed structure of a single filter sector will now be described in more detail referring to FIGS. 2–9. The illustrated filter sector 6 has filtrate conduits 19, 20 for filtrate achieved by filtration, which is deposited at the more narrow end of the filter sector to the pipe-like conduit section 7, which is intended to release the filtrate at its radially inner end to a completing filtrate conduit 8 within the rotor shaft 4.

These filtrate conduits 19, 20 are outwardly defined by a filtrating layer 21, 22 respectively permeable to the filtrate.

The filter sector 6 comprises at least one element 23, 24 provided with a profiling forming the filtrate conduits 19, 20. The profiled element 23, 24 forms itself the filtrating layer 21, 22 by means of that the profiled element 23, 24 has a perforation permeable to the filtrate, i.e. that a plurality of openings or apertures 35 (FIG. 9) are arranged in the profiled element. These openings or apertures may have different forms dependent on the filtrating conditions. The openings or apertures may for example be round, oval, quadrangular, slot-formed, i.e. elongated etc.

The profiling of the element 23, 24 forms projections/recesses, which in the illustrated embodiment have the character of ridges/valleys. These ridges/valleys are elongated and are preferably, but not necessarily, orientated in parallel. The ridges/valleys may suitably form a crinkled or waved profiling. The ridges are in the figures denoted with 25 and the valleys with 26. It may in this connection be pointed out that the expression ridges/valleys should be interpreted in a wide way. Within the scope of this expression cases where it is suitable to describe that a single element is formed by extending ridges from a main plane as well as cases where an element is formed with recessed valleys from a main plane should be included.

The filter sector 6 has on its both sides profilings and they form filtrate conduits 19, 20, which in direction towards the more narrow end of the filter sector intersectingly overlap each other, which clearly may be seen in FIGS. 4–6 and 9. The filter sector 6 has on each of its both sides a profiled portion 27, forming a plurality of substantially parallel filtrate conduits 19, 20 respectively, which run from an outer sector part respectively to an inner sector part, in which said filtrate conduits intersectingly overlap each other, and a substantially flat portion 28 corresponding to said outer sector part, said portion 28 forming said filtrate conduits 19, 20 together with the profiling on the opposite side of the filter sector. The substantially flat portion 28 is likewise perforated on both opposite sides in order to form a filtrating layer.

The filter sector 6 is formed by at least two at least partly profiled disc-like elements as the ones denoted 23 and 24, which are connected to each other by way of a sandwich structure. It is thereby preferred that both elements 23, 24 of the filter sector are formed substantially equally. This is clearly shown in FIGS. 2 and 3, which show the filter sector from its both opposite sides.

It is suitable that the profiling on one of the sides of the filter sector 6 gives rise to filtrate conduits extending substantially parallel to one of the radially extending edges of the filter sector while the profiling on the opposite side of the filter sector gives rise to filtrate conduits extending substantially parallel to the other radially extending edge of the filter sector.

Due to the filtrating layer on both sides of the filter sector being at least partly profiled, the active filter surface increases compared to prior art where the filter surfaces have always been flat. This increases the capacity. As a consequence of that the profiling forms ridges/valleys, the longitudinal direction of which running substantially radially, these ridges/valleys will before and at the delivery of the suspension in the container by the filter sector contribute to that the material filtered away from the filtrate is kept on both sides of the filter sector and brought up to the level of the removal means 11. When flat filtrating layers are arranged on both sides of the filter sector, there is a substantially bigger tendency that material filtered away falls off the filter sectors and back into the suspension in the container.

It is preferred that the elements 23, 24 are formed by discs of metal or plastics. It should be noted that especially in the case of plastics as construction material, it would be possible to form the elements 23, 24 of the filter sector so that they were made of only one piece of material.

When the elements 23, 24 are formed by two disc elements, it is suitable that they are kept together by edge profiles 29 at their radial edges. These edge profiles may for example be arranged in a way that the edge portions of the elements 23, 24, which are intended to be unperforated, extend into the edge profiles through a slot, which is provided in these, in a way that is evident in FIG. 9. The edge profiles 29 thereby suitably grip around flat towards each other located edge portions of the elements 23, 24. The filter sector has also an edge-forming element 30 at its periphery, said element 30 gripping around portions of the disc elements 23, 24. The edge element 30 must therefore be formed with waved contact surfaces towards the profiled portions 27 of the elements 23, 24 in order to achieve tightness, while the edge element 30 may abut flatly towards the flat portions 28 of the disc elements 23, 24.

In a direction radially inwards the conduit section 7 adjoins sealingly to the disc elements 23, 24 so that the filtrate conduits formed between them are able to deposit the filtrate in the conduit section. The conduit section 7 is for this purpose provided with axially defining walls 44 (FIG. 8), which are suitably arranged in a waved configuration to the outside of the adjacent, perforated portions 27 of the disc elements 23, 24.

Figure 9:
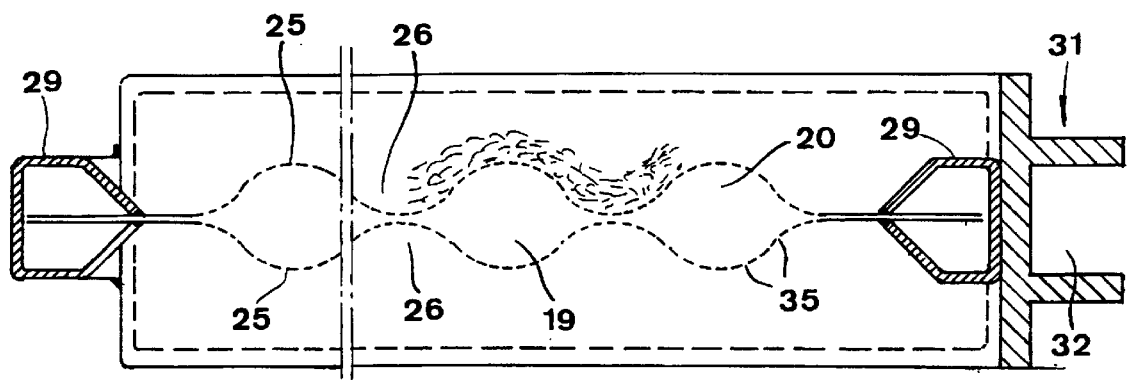
FIG. 9 is a cut along the line VI—VI in FIG. 2 showing a somewhat modified embodiment.

FIG. 9 illustrates how the filter sector at one of its radial edges has a specific connection element 31 provided in order to interact with an edge profile 29 of an adjacent filter sector to establish a male/female-like engagement, which can be fixed by latch means (not shown). The connection element 31 is here forming a female-like socket 32 for reception of an edge profile 29 on an adjacent filter sector. A somewhat different embodiment of the connection element 31 is illustrated in FIGS. 4 and 6, even if the same is still forming a female-like socket.

It should be pointed out that the perforation of the disc elements 23, 24, which have a rigid structure, i.e. is substantially different from a flexible filter cloth, may be realised by way of stamping, etching, laser cutting, etc.

This embodiment differs primarily from the previous by way of the filter sector having filtrate conduits forming profilings in the form of ridges/valleys over substantially the whole surface of both sides of the filter sector. The filtrate conduits formed by the profiling on one side of the filter sector extend substantially parallel to one radial edge of the filter sector, while the filtrate conduits formed by the profiling on the other side of the filter sector extend substantially parallel to the other radial edge of the filter sector, while the filtrate conduits thus will intersectingly overlap each other over substantially the whole surface of both sides of the filter sector, which is obvious by comparing FIGS. 10 and 11 and also FIG. 12.

It is in this embodiment suitable to form the elements 23, 24 so that they between each other form radially running conduits 33 at both radial edges of the filter sector, which conduits ensure that filtrate flowing in the filtrate conduits obliquely against the actual radial edge may enter into the edge conduit 33 and in this be guided radially inwards and be discharged in the conduit section 7 for further transport into the rotor shaft 4 (FIG. 1). This function is according to the invention achieved by that the elements 23, 24 at their radial edges are located with a relative distance in the axial direction of the filter sector, wherein these edges may have a distance piece 34 between each other. A connection element 31 is as previously present at one of the edges of the filter sector, which for coupling of two adjacent filter sectors may be arranged to engage with an edge forming distance piece 34 present at the other edge of the filter sector, which is not shown in FIG. 12.

The filtration layer itself is also in this case formed by the profiled elements 23, 24 by means of the disc-like elements 23, 24 having a perforation of the type described in connection with the previous embodiment.

It should be noted that it is also possible to apply a disc 45 between the profiled elements 23, 24 in order to obtain increased rigidity of the filter sector, which is shown in FIG. 12 with a dotted line. The filtrate conduits should in such a case be formed between each of the elements 23, 24 and the disc 45. The disc 45 could also be permeable to the filtrate due to a suitable perforation in order to equalize between the filtrate conduits. The disc 45 could however also be compact.

It should be noted that the elements 23, 24 may be relatively fixed on a plurality of positions over their surfaces, for example by means of intermittent or continuous welding or gluing. The disc 45 may if present be included in the fixation.

It is evident that the described device is not limited to the exemplified embodiments. Thus, the device according to the invention may be modified in several ways within the scope of the knowledge of the average man skilled in the art without deviating from the protection covered by the following claims. It should for example be noted that the projections/recesses which are the result of that the profiling of the element 23, 24 does not need to have the character of ridges/valleys extending along the whole or substantially the whole length of the element. These ridges/valleys could instead be present intermittent along the element in one of its dimensions. The element could furthermore have a further profiling, for example in the form of ridges/valleys in combination with the first mentioned in a thereto inclined, for example right-angled dimension in the main plane of the element. The inventive profiling of the element 23, 24 is, in more general terms, intended to be able to be realized with the aim of any projections/recesses as long as they lead to an increase of the filtrating surface, which is achieved as a consequence of the perforation of the element and as long as the profiling is of the type that it can give rise to filtrate conduits inside the perforated element in order to carry away the filtrate. The projections/recesses could for example be almost point-like, for example in the form of bulges, which are distributed over the surface of the element. The nature of the profiling, and also of the projections/recesses will of course be dependent on if the single element is intended to form the filtrate conduits by way of abutment to a plane disc or to another, also profiled element. If the filtrate conduits are intended to be formed between a profiled element and a plane disc, the profilings must of course be formed so that the filtrate is really able to flow from the radially outermost portion of the filter sector and into the innermost filtrate discharging conduit section 7. If, however, two profiled elements are intended to be located directly towards each other or with an intermediate location of a perforated disc, it is enough that these two profiled elements interacting with each other may form such conduits for carrying off filtrate, i.e. that the filtrate in that case might flow successively in filtrate conduits formed as a consequence of the profiling of one of the elements in order to thereafter flow towards the other profiled element and flow in the filtrate conduits formed in it, wherein in the case of an intermediate profiled disc, the filtrate would have to flow through its more or less large openings. Thus, it is evident from the description, that the term "profiling" according to the elements 23 and 24 includes all such formings, which give rise to a topography of the element, which in a suitably chosen cross section includes that it is possible to define projections or recesses or both of them and particularly in such a way that filtrate conduits may arise behind the perforated element, either as a consequence of the profiling of the single element or the profiling of this element in combination with the profiling of another element interacting with just said element. It is however always an advantage in the intended embodiments according to the invention that the topography on the outwards directed surfaces of the element, which topography is obtained as a consequence of the profiling of the element, will be formed by rounded surfaces in combination with possibly plane surfaces, i.e. that the forming should be such that mats of material filtered away, which are stuck on the filter sector should easy fall off and not tend to remain in angles and corners.

While the present invention has been described in accordance with preferred compositions and embodiments, it is to be understood that certain substitutions and alterations may be made thereto without departing from the spirit and scope of the following claims.

We claim:

1. A device in a filter sector for a rotating filter disc, comprising:

a profiled filtrating element defining perforations being permeable to a filtrate; and a filtrate conduit defined by the profiled filtrating element for carrying the filtrate resulting from filtration through the profiled filtrating element to a narrow end of the filter sector for discharging the filtrate, the profiled filtrating element being free from a filter cloth, the filter sector having a top side and a bottom side, a first filtrate conduit being defined by the top side and a second filtrate conduit being defined by the bottom side, both the first and second filtrate conduits extending toward the narrow end and the first filtrate conduit intersectingly overlapping the second filtrate conduit.

2. The device according the claim 1 wherein the profiled filtrating element has alternating projections and recesses defined therein.

3. The device according to claim 2 wherein the projections are elongated ridges and the recesses are elongated valleys.

4. The device according to claim 3 wherein the ridges and valleys form a waved profile.

5. The device according to claim 3 wherein the ridges and valleys form a crinkled profile.

6. The device according to claim 2 wherein the ridges have pointed tops that are distributed over the profiled filtrating element.

7. The device according to claim 1 wherein the filter sector has profiled surfaces extending substantially over both the top and bottom sides.

8. The device according to claim 1 wherein the top side has a profiled top portion and a substantially flat top portion and the bottom side has a profiled bottom portion and a substantially flat bottom portion, the profiled top portion and the substantially bottom flat portion define a set of substantially parallel top filtrate conduits, the profiled bottom portion and the substantially top flat portion define a set of substantially parallel bottom filtrate conduits, the top filtrate conduits intersect the bottom filtrate conduits, the top and bottom filtrate conduits extend from an outer part of the filter sector to an inner part of the filter sector.

9. The device according to claim 8 wherein the substantially flat top and bottom portions are perforated.

10. The device according to claim 1 wherein the filter sector is formed by a first partly profiled disc-shaped element and a second partly profiled disc-shaped element that are connected to one another.

11. The device according to claim 10 wherein a disc is disposed between the first partly profiled disc-shaped element and the second partly profiled disc-shaped element, a set of filtrate conduits are defined between the disc and the first and second partly profiled disc-like elements.

12. The device according to claim 10 wherein the first partly profiled disc-shaped element abuts the second disc-shaped partly profiled element and filtrate conduits are defined therebetween.

13. The device according to claim 10 wherein the first partly profiled disc-shaped element is substantially equal to the second partly profiled disc-shaped element.

* * * * *